April 11, 1961  W. M. HAMMOND, JR  2,979,715
RADAR METHOD AND APPARATUS FOR HEIGHT
AND SEA SURFACE CONTOUR MEASUREMENT Filed May 31, 1957

INVENTOR
WARDLAW M. HAMMOND JR.
BY
Julian C. Renfro
ATTORNEY

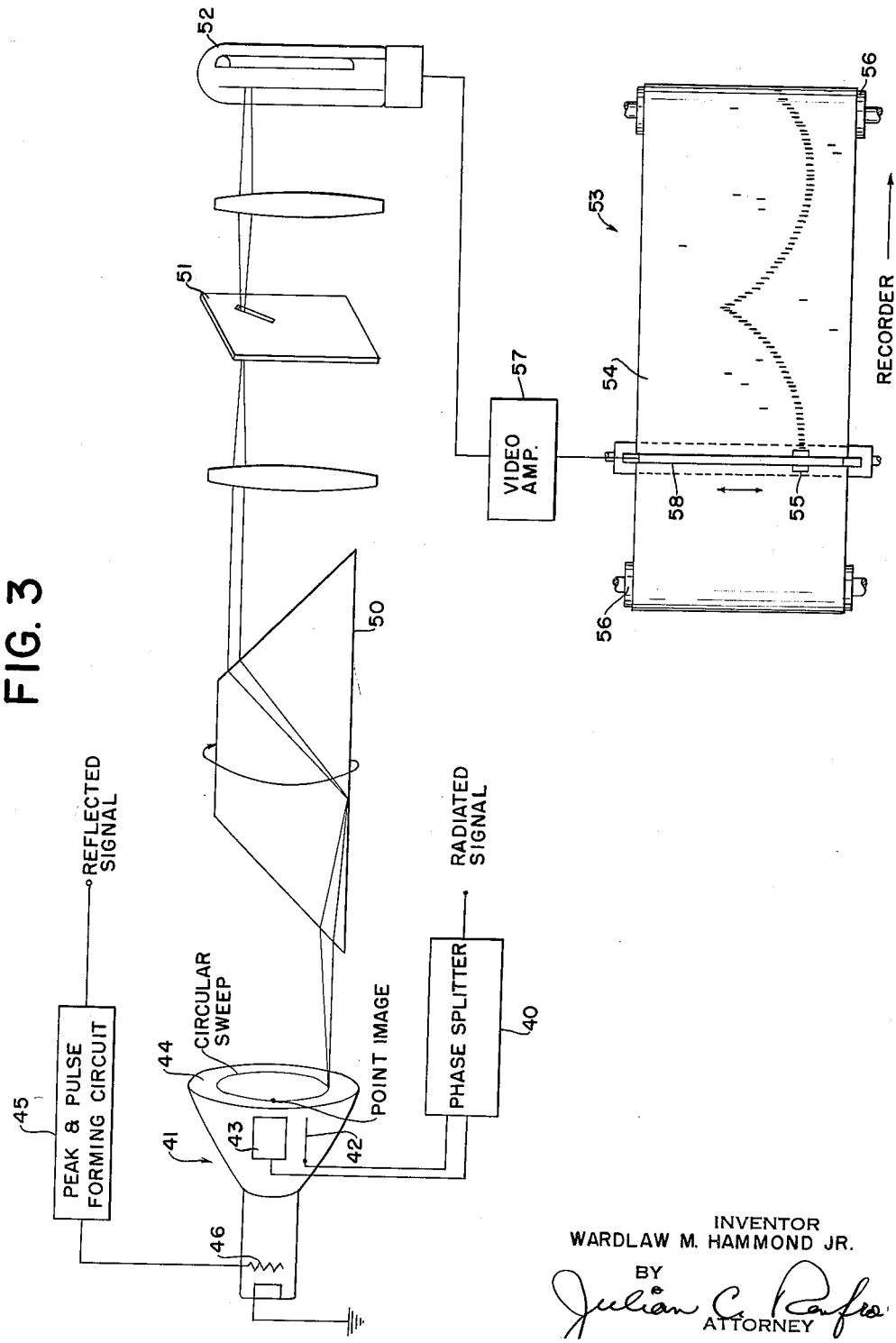

2,979,715
Patented Apr. 11, 1961

2,979,715
RADAR METHOD AND APPARATUS FOR HEIGHT AND SEA SURFACE CONTOUR MEASUREMENT

Wardlaw M. Hammond, Jr., Philadelphia, Pa., assignor to The Martin Company, a corporation of Maryland Filed May 31, 1957, Ser. No. 662,887

10 Claims. (Cl. 343—12)

The present invention relates to height-measuring radar devices and methods for producing a display representative of the contour of a sea surface, and more particularly to such radar devices and methods producing displays which discriminate against spurious reflected signals, the information as to sea surface and altitude being of particular interest to the operation of seaplanes in open ocean areas.

Among conventional height-measuring radars are those which employ either a frequency modulated or amplitude modulated microwave signal which is radiated in a beam toward a reflecting surface. In the frequency modulated system the height above the reflecting surface is measured by comparing the frequency of the radiated signal with the frequency of the reflected signal. In the amplitude modulated system the modulation phase of the radiated signal is compared with that of the reflected signal. In either event the change in frequency or phase is proportional to the distance from the radar system to the reflecting surface, and therefore is indicative of height.

Either of the described height-measuring radars produces excellent results when measuring the height above a fixed or stationary reflecting surface such as land. Such radars, however, give inaccurate results when employed to determine height above a limited ocean surface in motion due to their inability to discriminate against the spurious signals produced by an undulating reflecting surface such as the waved surface of a turbulent sea.

These spurious signals are caused by particle motion in the sea waves which produce Doppler frequency shift of the reflected radar signals. A radar echo may follow one or more paths of reflection, each of which may be influenced by such a Doppler shift. Thus a number of Doppler shift frequencies may be present in these several paths. Such a plurality of Doppler shift frequencies may combine by phase cancellation and reinforcement to develop spurious signals which are similar to the original modulated wave and may therefore be detected by the radar receiver. These spurious signals have a random wave phase and frequency and thus introduce a substantial error within the phase comparison circuits of the conventional height-measuring radar. This effect is very marked in a radar which employs a narrow beam for the purpose of inspecting a limited area of the ocean surface.

It is the object of the present invention to substantially eliminate the errors introduced by multipath Doppler shift interference in the measurement of height above a turbulent reflecting sea surface. To this end the invention provides an improved radar device and method adapted to discriminate against the error producing spurious signals caused by the multipath Doppler shift.

The improved radar system employs an amplitude modulated continuous wave signal for radiation toward the sea surface. Means are provided within the system for periodically determining the modulation phase difference between the radiated signal and the signal reflected from the sea surface. These periodic determinations provide a measurement of height above the sea surface at a plurality of spaced instances in time.

The invention recognizes that the non-spurious reflected signals return to the radar by a single reflecting path and may be distinguished by their regularly recurrent characteristic from the random multipath returns. This characteristic is manifested by a correlation in time in the periodic phase difference determinations produced by the non-spurious reflected signals.

The improved radar system therefore further comprises a height indicating display which is adapted to illustrate this phase difference correlation and thus discriminate against the Doppler generated spurious signals. The display is graphical in form having abscissa and ordinate axes, and adapted to display time on one of its axes and modulation phase difference, or height, on the other of its axes. The periodic determinations provided by the improved radar system are employed to produce a plot of modulation phase difference versus time on the graph display. The non-correlated spurious signals will thus produce randomly distributed marks on the graph display. The correlated determinations, on the other hand, will produce a substantially continuous plot representative of the sea surface contour and readily distinguishable from the randomly distributed marks.

The invention provides two preferred embodiments of a height-measuring radar system adapted to produce a graph display as described above. These embodiments can be best understood by referring to the following drawings in which:

Fig. 3 is a schematic and block diagram of a height-measuring radar system in accordance with the invention which employs a recorder display.

Figure 1:
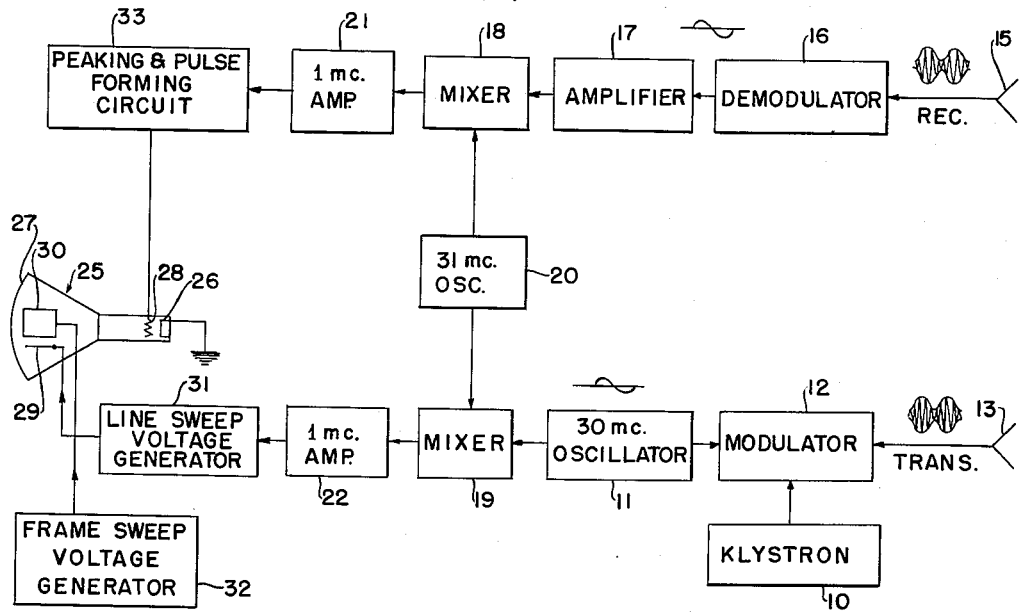
Fig. 1 is a block diagram of a height-measuring radar system in accordance with the invention which employs a cathode-ray tube display.

Referring to Fig. 1 the improved radar system includes a transmitting section for radiating a signal toward a subject sea surface. The transmitting section comprises a klystron microwave source 10 and an oscillator circuit 11, the outputs of which are applied to a modulator circuit 12. The klystron thus provides a microwave carrier which is amplitude modulated by the sine wave output of the oscillator circuit. It has been found that 30-megacycle amplitude modulation is well adapted for most sea surface applications. The amplitude modulated continuous wave wave output of the modulator circuit 12 is then applied to a directive antenna 13 for radiation toward the sea surface.

The improved radar system further includes a receiving section adapted to pick up the amplitude modulated signal after it is reflected from the sea surface. This section comprises an antenna 15 for receiving the reflected signal, a demodulator circuit 16, and an amplifier circuit 17. The antenna output is applied to the demodulator which produces at its output a signal representative of the amplitude modulation of the reflected signal. The amplifier 17 is adapted to control the amplitude of the demodulated signal.

For a system exclusively designed for sea surface contour measurement such as may be useful to seaplane operations, a directive antenna beam of approximately 1.5 degrees has been found to be desirable, and such an antenna can be designed with conventional data that relates antenna beam width, transmitted wave length and aperture for a parabolic reflector. For example, such data can be found on page 803 of Reference Data for Radio Engineers, 4th Edition, published by International Telephone and Telegraph Corporation.

The signal output of the demodulator circuit 16 and the oscillator circuit 11 possess the same sinusoidal frequency. These signals shall be referred to as the reflected signal and radiated signal, respectively, regardless of their changes as caused by the radar system.

The phase of the reflected signal will differ from the phase of the radiated signal in proportion to the distance traveled by the signal from transmitting to receiving antenna. The phase difference between the radiated and reflected signals is therefore a measurement of radar height above the sea surface, and when using a narrow receiving antenna beam, the height of individual waves. In accordance with the invention the signals are periodically compared in phase to produce a series of height measurements which are spaced in time.

In effecting the phase comparison the reflected and radiated signals are first converted to a lower frequency to facilitate the design of the subsequent phase comparing circuitry and components. The frequency conversion is accomplished by means of a mixer circuit 18 for the amplifier circuit 17 and a mixer circuit 19 for the oscillator circuit 11. The output of a local oscillator circuit 20 is applied to both mixers where it is combined with the reflected and radiated signals. The frequency of the output of each mixer circuit is equal to the difference in the frequency of its input voltages. Thus frequency conversion is effected without disturbing the phase relationship between the reflected and radiated signals. In the illustrated embodiment the local oscillator voltage is given a frequency of 31 mc. The output of the mixer circuits therefore oscillates at a frequency of 1 mc. The output of each mixer is then amplified by means of amplifier circuits 21 and 22.

The remainder of the radar system circuitry operates to simultaneously provide periodic measurements of the modulation phase difference between the radiated and reflected signals, and to plot these phase differences versus time on a graphical display device. This simultaneous action is effected on a conventional raster scanning cathode-ray tube 25. The cathode-ray tube includes a cathode 26 for generating an electron beam toward the image screen 27 of the tube. The image screen 27 advantageously employs a retentive phosphor coating. A control electrode 28 is disposed in the path of the electron stream to control its intensity. The electron stream is scanned in a raster across the image screen by means of line deflection plates 29 and frame deflection plates 30.

To produce this raster the radar system provides a sweep generator circuit 31 which is adapted to provide line sweep voltages for the cathode-ray tube. The sweep generator is additionally adapted to be synchronized to the phase of an input sine wave voltage. Thus the line sweep output voltage is synchronized to the phase of the radiated signal by applying the output of amplifier 22 thereto. A frame sweep generator 32 is also provided to display the line sweep voltages in raster sequence along the image screen 27 of the cathode-ray tube. The period of the frame sweep voltage is selected to provide a reference time base for the display of line sweep voltages.

The remainder of the phase comparing circuit comprises a peaking and pulse-forming circuit 33. This circuit is adapted to develop narrow pulses synchronized with the phase of an input sine wave signal. Thus the output pulses of circuit 33 are synchronized to the phase of the reflected signal by applying the output of amplifier 21 thereto. These output pulses are representative of the phase of both the non-spurious reflected signals and the spurious signals resulting from Doppler shift interference.

The pulses from circuit 33 are applied to the control electrode 28 of the cathode-ray tube. In this manner the intensity of the electron beam of the cathode-ray tube is periodically varied to produce images on the line sweeps of the image screen raster. Since the line sweeps of the raster are in synchronism with the phase of the radiated signal, and the pulses are in synchronism with the phase of the reflected signal, the position of the images on the line sweeps is representative of the periodic modulation phase difference between the radiated and reflected signals. In addition, since the line sweep voltages are displayed in sequence along a time axis provided by the frame sweep voltage, the images will form a graphical plot of modulation phase difference versus time on the image screen of the cathode-ray tube.

Figure 2:
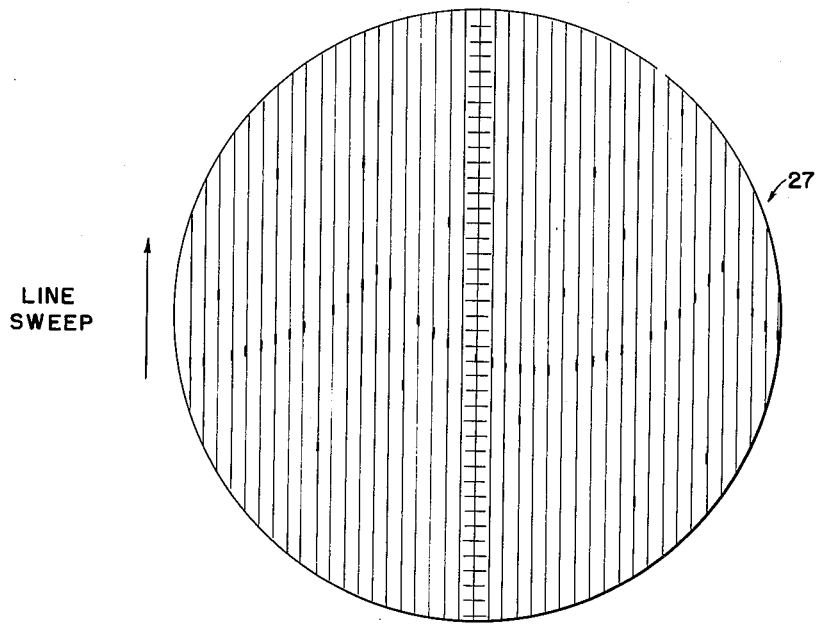
Fig. 2 is a diagram of the graph image as produced by the cathode-ray tube display of Fig. 1.

An illustration of the plot produced by this means is shown in Fig. 2. Due to their correlation in phase difference the images produced by the non-spurious signals will form a substantially continuous line along the graphical plot. On the other hand, spurious signals resulting from multipath reflection will produce randomly positioned images. Thus the desired and undesired signal can be readily distinguished by means of the graphical display 27.

The present invention may be employed as a height-indicating radar system in a seaplane to produce an indication representative of the contour of a sea surface preparatory to landing. In such case the duration of the horizontal sweep is preferably adjusted to be at least as long as the time required to fly between sea waves. In this way the continuous plot on the graph display will include the crest and trough of one or more waves. This two-dimensional plot quickly provides the radar operator with the critical parameters of wave height and distance between waves. It has been found that a horizontal sweep lasting approximately ten seconds is ordinarily optimal for this purpose.

In determining altitude above a sea surface the modulation frequency of the radiated signal should be adjusted so that one wave-length is greater than the total altitude to be measured. This prevents ambiguity in height measurement resulting from a lack of information as to the number of modulation wave-lengths required to traverse the distance to the sea surface.

An alternate embodiment of the improved radar system is illustrated in Fig. 3. This system is adapted to provide a permanent record of the scanned sea surface. In addition, this embodiment simplifies the required circuitry by eliminating the need for fast rise time raster-forming sweep voltages.

The sections of this radar system prior to the phase comparing circuitry are identical to those of the system of Fig. 1. In the phase comparing circuitry the radiated signal is applied as a reference to a phase-splitter circuit 40. The phase-splitter circuit is adapted to produce a pair of sine wave voltages 90° out of phase and synchronized with the phase of the radiated signal. One of these sine wave voltages is applied to the vertical deflection plates 42 of a cathode-ray tube 41 and the other is applied to its horizontal deflection plates 43. In this way a circular sweep is produced on the image screen 44 of the cathode-ray tube. Due to the synchronization of the phase-splitter circuit 40 the period of the circular sweep is synchronized with the phase of the radiated signal.

The reflected signal is again applied to synchronize therewith the pulse output of a peak and pulse-forming circuit 45. The pulse output is applied to the control electrode 46 of the cathode-ray tube. Thus images are periodically produced on the circular sweep, their positions on the sweep being representative of the periodic phase difference between the radiated and reflected signals.

The circular sweep display does not have a time base and therefore does not provide an arrangement of the images which illustrates the phase correlation of the non-spurious signals. To produce such a graphical display this embodiment employs a rotating dove prism 50. Such a prism, as is well known, has the property of rotating a beam of light at twice the rate of rotation of the prism. The prism is positioned between the sweep and an opaque screen 51 having an aperture therein. In this way the prism rotates the circular sweep relative to the aperture in the opaque screen 51. The aperture therefore effectively scans the circular sweep searching for an image. To this end the image screen 44 employs a phosphor which has a retentivity such as to store an image throughout the period required for one complete scan.

A photosensitive tube 52 is provided to produce output signals at the moment light from the images passes through the aperture. Due to the scanning the time at which such output signals are produced relative to the rotation period of the dove prism is proportional to the positions of the images on the circular sweep.

A high-speed recording unit 53 is provided to permanently record the output signals of the photosensitive tube 52. The recording unit comprises a writing surface 54 and a scriber element 55. In a preferred embodiment the scriber element is an electrical stylus which writes by activating an electrosensitive surface. The scriber element 55 is adapted to reciprocate laterally across the face of the recording surface on a guide 58 in synchronism with the rotation period of the dove prism 50. In addition the scriber element is adapted to write marks upon the surface 54 when activated by signals from the photosensitive tube through video amplifier 57. Thus the positions of the written marks on surface 54 are proportional to the positions of the images on the circular sweep, and therefore representative of modulation phase difference.

A correlating time base for the written marks is provided by mounting the surface 54 on a pair of rollers 56. Rotation of the rollers continuously shifts the longitudinal position of the scriber element 55 relative to the writing surface 54, thus producing the desired graphical plot of modulation phase difference, as represented by the written marks, versus time. The time base for the plot may be adjusted to a suitable value by varying the speed of roller rotation.

It should be noted that the phase comparing sections employed in both of the described radar systems are not of the conventional averaging type. It is well known that for a detection system to extract maximum signal information from a background of noise it must have a frequency bandwidth at least as wide as that of the signal. The conventional averaging phase comparator, if employed in the present invention, would require a relatively high signal-to-noise ratio in order to operate accurately due to its limited frequency response.

With the phase comparator circuits provided by the present invention all received signals can be substantially instantaneously displayed without delay or error. This is due to the fact that the present phase comparator is essentially a wide-band detection device, capable of making full use of the frequency bandwidth of the signal, and very sensitive to low signal-to-noise ratios.

Preferred embodiments of the invention have been described. Various changes and modifications may be made in the scope of the invention as set forth in the appended claims.

I claim:

1. A height-measuring radar system for use over a turbulent ocean to produce a display representative of the contour of an undulating sea surface and which discriminates against spurious reflected signals, which comprises a generator circuit for producing an amplitude modulated continuous wave signal, transmitting means associated with said generator circuit and adapted to radiate said signal toward the surface of the sea, receiving means adapted to receive said signal after reflection from the sea surface, phase comparing means responsive to said generator circuit and to said receiving means, respectively, for periodically measuring the modulation phase difference between the signal radiated from said transmitting means and the signal received at said receiving means, said phase comparing means including a graph display device having abscissa and ordinate axes and adapted to display time on one of said axes and modulation phase difference on the other of said axes, said phase comparing means also including means for producing a plot on said graph display of the said modulation phase difference measurements versus time, a substantially continuous plot being representative of the contour of the sea surface and discriminative against spurious reflected signals which appear as random signals on said graph display.

2. The method of producing a display in a height-measuring radar system for use over a turbulent ocean which is representative of the contour of an undulating sea surface and which discriminates against spurious reflected signals, comprising generating an amplitude modulated continuous wave signal, radiating said signal toward the surface of the sea, receiving said signal after reflection from the sea surface, periodically measuring the modulation phase difference between said radiated signal and said reflected signal, and producing from said periodic measurements a graphical plot of modulation phase difference versus time, a substantially continuous plot being representative of the contour of the sea surface and discriminative against spurious reflected signals.

3. A height-measuring radar system for use over a turbulent ocean to produce a display representative of the contour of an undulating sea surface and which discriminates against spurious reflected signals, which compris s a first generator circuit for producing a high frequency carrier wave oscillation, a second generator circuit for producing a comparatively low frequency modulating oscillation, a modulator circuit responsive to said first and second generator circuits, respectively, for modulating the amplitude of said carrier wave oscillation with said modulating oscillation to produce a radar signal, transmitting means associated with said modulator circuit and adapted to radiate said radar signal toward the surface of the sea, antenna means adapted to receive said radar signal after reflection from the sea surface, a demodulator circuit responsive to said antenna means and adapted to produce an output demodulated oscillation representative of the amplitude modulation of said reflected signal, phase comparing means responsive to said second generator circuit and to said demodulator circuit, respectively, for periodically measuring the modulation phase difference between the signal radiated from said transmitting means and the signal received at said antenna means, said phase comparing means including a graph display device having abscissa and ordinate axes and adapted to display time on one of said axes and modulation phase difference on the other of said axes, said phase comparing means also including means for producing a plot on said graph display of the said modulation phase difference measurements versus time, a substantially continuous plot being representative of the contour of the sea surface and discriminative against spurious reflected signals which appear as random signals on said graph display.

4. The method of producing a display in a height-measuring radar system for use over a turbulent ocean which is representative of the contour of an undulating sea surface and which discriminates against spurious reflected signals, comprising generating a high frequency carrier wave oscillation, generating a comparatively low frequency modulating oscillation, modulating the amplitude of said carrier wave oscillation with said modulating oscillation to produce a radar signal, radiating said radar signal toward the surface of the sea, receiving said radar signal after reflection from the sea surface, demodulating the said reflected signal to produce an output demodulated oscillation representative of the amplitude modulation of said reflected signal, periodically measuring the modulation phase difference between the said modulating oscillation and the said demodulated oscillation, and producing from said periodic measurements a graphical plot of modulation phase difference versus time, a substantially continuous plot being representative of the contour of the sea surface and discriminative against spurious reflected signals.

5. A height-measuring radar system for use over a turbulent ocean to produce a display representative of the contour of an undulating sea surface and which discriminates against spurious reflected signals, which comprises a generator circuit for producing an amplitude modulated continuous wave signal, transmitting means associated with said generator circuit and adapted to radiate said signal toward the surface of the sea, antenna means adapted to receive said signal after reflection from the sea surface, a cathode-ray tube having an image screen, means for generating an electron beam directed toward said image screen, a control electrode disposed in the path of said electron stream and adapted to control the intensity thereof, and line and frame deflection means for scanning the said electron beam in a raster across the said image screen, a first voltage generator responsive to the signal radiated by said transmitting means and adapted to produce line sweep voltages for said cathode-ray tube which are synchronized with the phase of said radiated signal, a second voltage generator adapted to produce frame sweep voltages for said cathode-ray tube which are synchronized with a preselected reference time base, means for connecting said line sweep voltages to said line deflection means and said frame sweep voltages to said frame deflection means to produce a raster on the said image screen of said cathode-ray tube, a pulse generating circuit responsive to the reflected signal received at said antenna means and adapted to produce pulses synchronized with the phase of said reflected signal, and means for connecting said pulses to the said control electrode to periodically vary the intensity of the said scanning electron beam and to produce images representative of the phase difference between the said radiated signal and the said reflected signal on the line sweeps of the said image screen raster, a substantially continuous plot of said images being representative of the contour of the sea surface and discriminative against the said spurious reflected signals.

6. A height-measuring radar system for use over a turbulent ocean to produce a display representative of the contour of an undulating sea surface and which discriminates against spurious reflected signals, which comprises a generator circuit for producing an amplitude modulated continuous wave signal, transmitting means associated with said generator circuit and adapted to radiate said signal toward the surface of the sea, antenna means adapted to receive said signal after deflection from the sea surface, a cathode-ray tube having an image screen, means for generating an electron beam directed toward said image screen, a control electrode disposed in the path of said electron stream and adapted to control the intensity thereof, and vertical and horizontal deflection means for scanning the said electron beam across the said image screen, a phase-splitter circuit responsive to the signal radiated by said transmitting means and adapted to produce a pair of sine wave output voltages 90° out of phase and in synchronism with the phase of the said radiated signal, means for connecting one of said sine wave output voltages to said horizontal deflection means and the other of said sine wave output voltages to said vertical deflection means to produce a circular sweep on the said image screen of said cathode-ray tube, a pulse generating circuit responsive to the reflected signal received at said antenna means and adapted to produce pulses synchronized with the phase of said reflected signal, means for connecting said pulses to the said control electrode to periodically vary the intensity of the said scanning electron beam and to periodically produce an image on the said image screen circular sweep, the position of the said image on the said circular sweep being representative of phase difference between the said radiated signal and the said reflected signal, scanning means adapted to rotatively scan said circular sweep in search for a said image, a photosensitive device arranged and adapted in association with said scanning means to produce an output signal when the said scanning means is in coincidence with a said image, and a recording device having a writing surface and a writing element adapted to reciprocate laterally across said writing surface and to move longitudinally relative to said writing surface, the said reciprocal movement being synchronized with the rotative period of said scanning means, and the said longitudinal movement being synchronized with a preselected reference time base, said writing element being adapted to produce a mark on said writing surface in response to a signal from said photosensitive device, a substantially continuous plot of said marks being representative of the contour of the sea surface and discriminative against the said spurious reflected signals.

7. A height-measuring radar system in accordance with claim 6 in which said scanning means comprises an opaque screen having an aperture therein and positioned between the said photosensitive device and the said image screen, and a rotating dove prism arranged between said image screen and said opaque screen and adapted to scan said circular sweep relative to the aperture in said opaque screen, said photosensitive device being arranged to produce an output signal when the said scanning dove prism positions an image on the said circular sweep in coincidence with the aperture in the said opaque screen.

8. A height-measuring radar system in accordance with claim 1 in which said transmitting means is designed to produce a highly directive transmission beam for radiation towards the surface of the sea.

9. A height-measuring radar system in accordance with claim 5 in which said transmitting means includes transmitting antenna means designed to produce a highly directional beam for radiation towards the surface of the sea.

10. A height-measuring radar system in accordance with claim 7 in which said transmitting means includes transmitting antenna means designed to produce a highly directional transmitting beam for radiation towards the surface of the sea.

References Cited in the file of this patent

UNITED STATES PATENTS

| | | |
|---|---|---|
| 2,280,524 | Hansen | Apr. 21, 1942 |
| 2,710,959 | Pierce | June 14, 1955 |
| 2,641,754 | Clegg | June 9, 1953 |

FOREIGN PATENTS

| | | |
|---|---|---|
| 520,778 | Great Britain | May 3, 1940 |